US011893150B2

(12) United States Patent
Alexander et al.

(10) Patent No.: US 11,893,150 B2
(45) Date of Patent: Feb. 6, 2024

(54) SYSTEMS AND METHODS FOR MULTI-POINT VALIDATION IN COMMUNICATION NETWORK WITH ASSOCIATED VIRTUAL REALITY APPLICATION LAYER

(71) Applicant: BANK OF AMERICA CORPORATION, Charlotte, NC (US)

(72) Inventors: James Alexander, Dripping Springs, TX (US); Harold Joseph Kennedy, Winter Park, FL (US); Stephen Thomas Shannon, Charlotte, NC (US); David Smiddy, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/851,386

(22) Filed: Jun. 28, 2022

(65) Prior Publication Data

US 2023/0418365 A1    Dec. 28, 2023

(51) Int. Cl.
*G06F 3/01* (2006.01)
*G06Q 20/40* (2012.01)
*G06F 1/16* (2006.01)

(52) U.S. Cl.
CPC ........... *G06F 3/011* (2013.01); *G06Q 20/401* (2013.01); *G06F 1/163* (2013.01)

(58) Field of Classification Search
CPC ........ G06F 3/011; G06F 1/163; G06Q 20/401
See application file for complete search history.

(56) References Cited

U.S. PATENT DOCUMENTS

| | | |
|---|---|---|
| 10,022,614 B1 | 7/2018 | Tran et al. |
| 10,200,834 B2 | 2/2019 | Tran et al. |
| 10,360,495 B2 | 7/2019 | Chapela et al. |
| 10,521,776 B2 | 12/2019 | Zhou et al. |
| 10,587,410 B2 | 3/2020 | Drouin et al. |
| 10,855,760 B2 | 12/2020 | Ratias |
| 10,867,061 B2 | 12/2020 | Collart |
| 10,885,530 B2 | 1/2021 | Mercury et al. |
| 10,924,363 B2 | 2/2021 | Pan et al. |
| 10,967,255 B2 | 4/2021 | Rosado |
| 11,049,082 B2 | 6/2021 | Rice |
| 11,094,122 B2 | 8/2021 | Stcker |
| 11,202,037 B2 | 12/2021 | Yerli |
| 11,205,219 B2* | 12/2021 | de Sousa Moura ... G06Q 40/03 |
| 11,327,629 B2 | 5/2022 | Berquam et al. |
| 11,436,821 B2 | 9/2022 | Harrison et al. |
| 2018/0323972 A1 | 11/2018 | Reed et al. |
| 2018/0349893 A1 | 12/2018 | Tsai |
| 2019/0156198 A1* | 5/2019 | Mars ..................... G06Q 40/02 |
| 2019/0266661 A1* | 8/2019 | de Sousa Moura ... G06N 20/00 |
| 2019/0306147 A1* | 10/2019 | Uhr ........................ H04L 9/0643 |

(Continued)

*Primary Examiner* — Antonio Xavier
(74) *Attorney, Agent, or Firm* — Moore & Van Allen PLLC; Nicholas C. Russell

(57) ABSTRACT

With the advent of augmented reality devices becoming increasingly prevalent, accessible, and cross-compatible, there is an opportunity to leverage the capabilities of such devices in order to streamline user interactions related to complex resource activities which require elevated security and typically are only conducted on an in-person basis. The present invention provides systems and methods for securely verifying a user during an augmented reality device session for the purposes of conducting complex resource activities.

17 Claims, 5 Drawing Sheets

(56) References Cited

U.S. PATENT DOCUMENTS

| | | |
|---|---|---|
| 2019/0325498 A1 | 10/2019 | Clark |
| 2019/0340306 A1 | 11/2019 | Harrison et al. |
| 2020/0104522 A1* | 4/2020 | Collart ................... G06T 19/20 |
| 2020/0294097 A1 | 9/2020 | Spivack et al. |
| 2020/0302510 A1 | 9/2020 | Chachek et al. |
| 2021/0081936 A1* | 3/2021 | Nuzzi ................ G06Q 20/0655 |
| 2021/0258666 A1 | 8/2021 | Mazed |
| 2021/0342836 A1* | 11/2021 | Cella ..................... H04L 9/3239 |
| 2021/0367758 A1* | 11/2021 | Emmadi ............. H04L 63/1483 |
| 2021/0398104 A1* | 12/2021 | Yan ..................... G06Q 20/401 |
| 2022/0284428 A1* | 9/2022 | Zhou ................... G06Q 20/401 |
| 2023/0009641 A1* | 1/2023 | Siejca ..................... G06V 20/20 |
| 2023/0267551 A1* | 8/2023 | Breitweiser ............. G06F 3/011 |
| | | 705/4 |

* cited by examiner

SYSTEMS AND METHODS FOR MULTI-POINT VALIDATION IN COMMUNICATION NETWORK WITH ASSOCIATED VIRTUAL REALITY APPLICATION LAYER

FIELD

The present invention generally relates to systems, products, and methods which utilize decentralized security and augmented reality technologies in order to provide an enhanced user experience.

BACKGROUND

With the advent of augmented reality devices and virtual reality devices becoming increasingly prevalent, accessible, and cross-compatible, there is an opportunity to leverage the capabilities of such devices in order to enhance user environments and streamline information access in number of contexts, including remote-customer contexts. There is a need for an integrated, dynamic, system for leveraging capabilities of augmented reality systems in order to provide users with useful, familiar, or critical information in a dependable, seamless, enjoyable, and secure manner.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for augmenting or virtually rendering user environments. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

Aspects of the invention described herein provide an innovative solution for augmenting user environments to provide an enhanced or dynamic environment no matter the user's particular physical location, and depending on the user's preferences or situational requirements. The invention provides a user experience that may be both more enjoyable and more productive than conventional remote environments, and may also allow for increased efficiency through the use of intelligent gesturing and predictive adaptability. As such, the system allows for dynamic response to user input, user preferences, user data patterns, application data, or situational demands.

For instance, through the use of augmented reality systems, it is conceivable that the user's environment may be transformed via the use of virtual information overlay. In some embodiments, this may comprise a digitization of the user's surrounding spatial environment through the overlay of particular environmental features on the user's surroundings. The invention may be used to emulate a typical brick-and-mortar entity environment regardless of the user's actual location (e.g., the user may be made to feel as though they are at a physical branch location, trading floor, or the like, even though they are in a relatively blank room at their home, or the like). Not only does this give the user a sense of familiarity, regardless of their actual location, it also allows multiple users to utilize the same space for different reasons, reducing the need for additional office space, whether at the user's home or workplace. For instance, a single room in a user's home may be utilized to emulate a trading floor, office, conference room, branch office location, or the like.

In other embodiments, this same technology can be used to provide visual indications of certain information such as wait-times, or the like, by rendering a dynamic view of one or more user avatars in a line at a rendered branch location, showing the user a visual representation of how busy the entity may be in responding to other user requests. The user may be able to quickly scan the virtual environment and discern how long they may need to wait to speak with a service representative by simply visually recognizing their place in line.

In still further embodiments, the system may be utilized to improve the ergonomics of the user's space in order to not only increase efficiency and productivity, but also provide increased convenience and accessibility to allow the user to more easily complete various tasks. For instance, in some embodiments, the system may provide gesture control to users who may require assistance with motor control. By continuously analyzing the user's gaze, location within their environment, and movement of their head, eyes, limbs, or the like (e.g., via user device cameras, infrared sensors, gyroscope sensors, LiDAR sensing, or the like), the system may be programmed to complete automated actions depending on how the user has configured the system. It is understood that this is only one specific embodiment provided for exemplary purposes, but that the system may be configured in any number of ways to integrate with various application and operating systems in order to automate actions of one or more connected devices or manipulate the augmented reality or virtual reality environment of the user.

For sample, illustrative purposes, system environments will be summarized. Generally, the invention may comprise the steps of: receiving an interaction request from a user via an augmented reality device; verifying the user's identity via third party decentralized register; generating an augmented reality session in response to the interaction request; transmitting a real-time video stream to the augmented reality device; and continually updating the real-time video stream in response to one or more user inputs via the augmented reality device.

In some embodiments, the interaction request further comprises a request related to a user resource account.

In other embodiments, the real-time video stream further comprises a computer generated avatar.

In still further embodiments, the augmented reality device further comprises a virtual reality headset.

In other embodiments, the interaction request further comprises one or more requests for sensitive resource account actions such as title transfer, notarization, resource advances, cashier's checks, retirement account redemptions, currency exchanges, or foreign account transfers.

In some embodiments, verifying the user's identity via third party decentralized security provisioning service further comprises conducting a verification transaction on a public blockchain to verify ownership of a wallet belonging to the user.

In still further embodiments, the invention is further configured to reference a multifactor digital authentication database in conjunction with verifying user's identity via third party decentralized register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
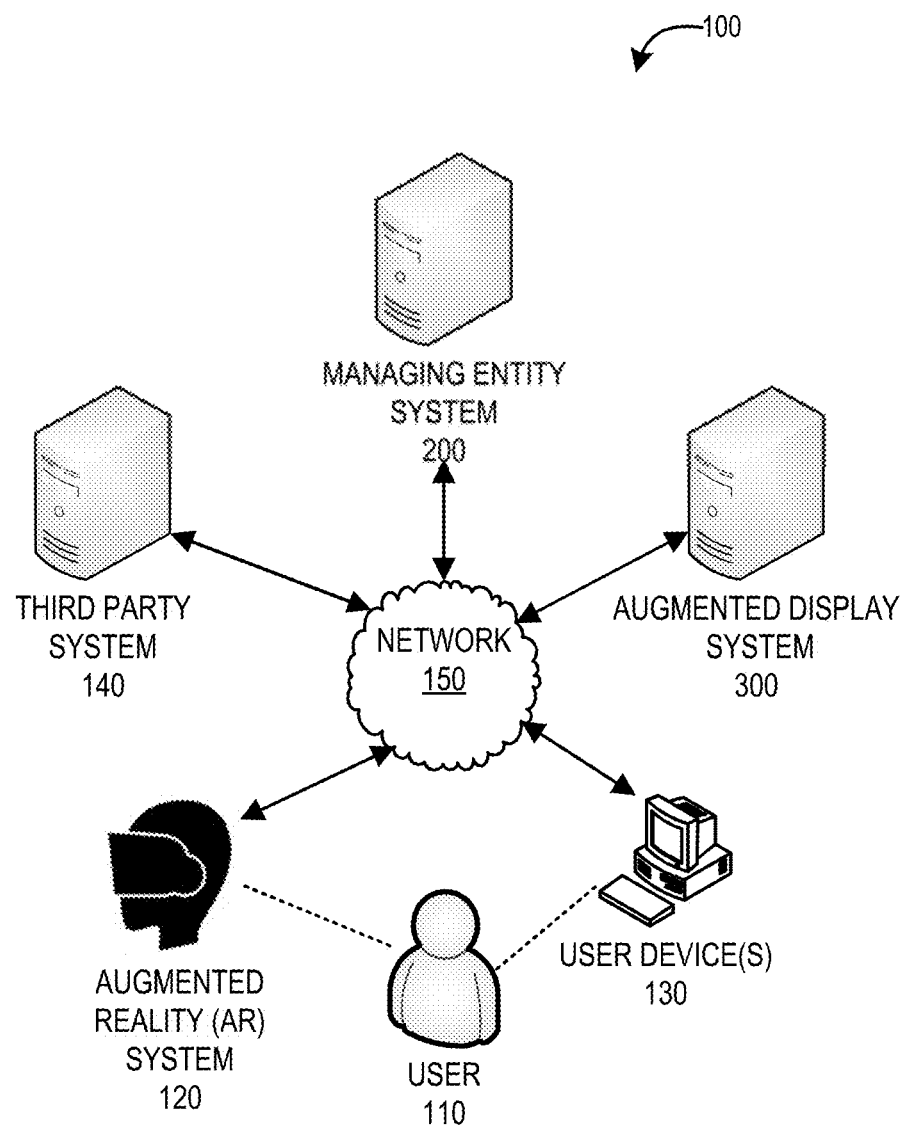
Figure 2:
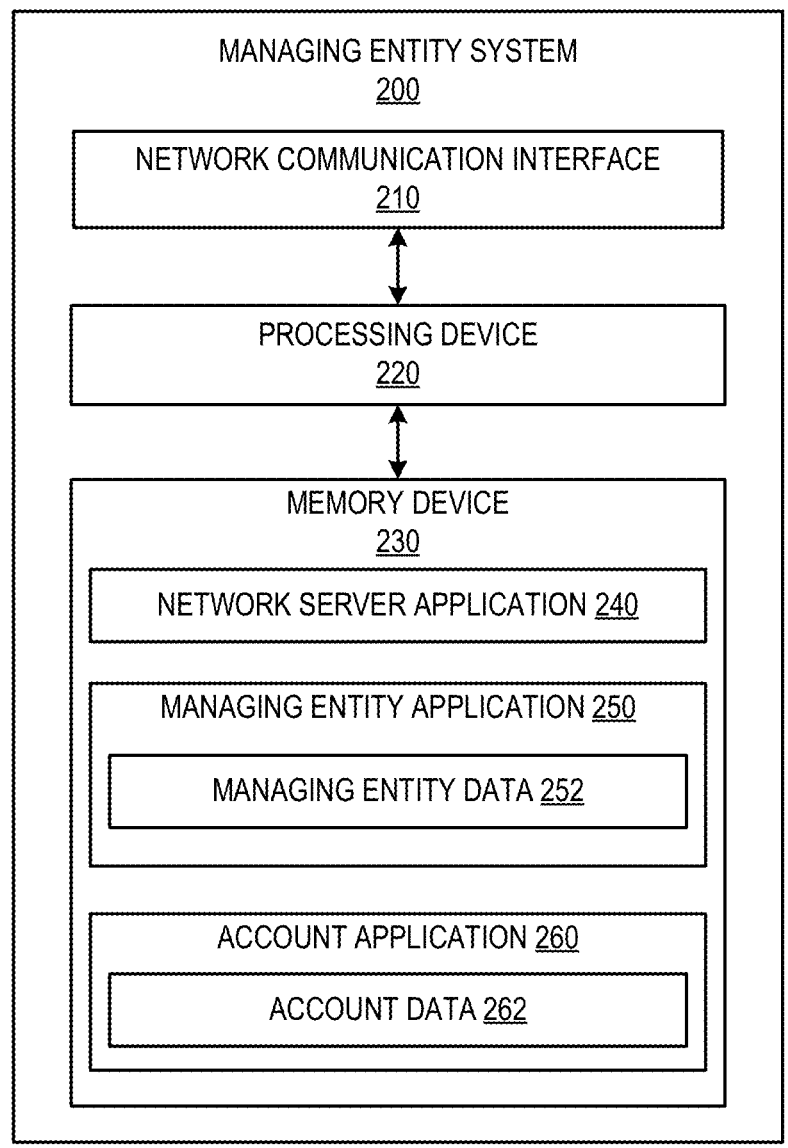
Figure 3:
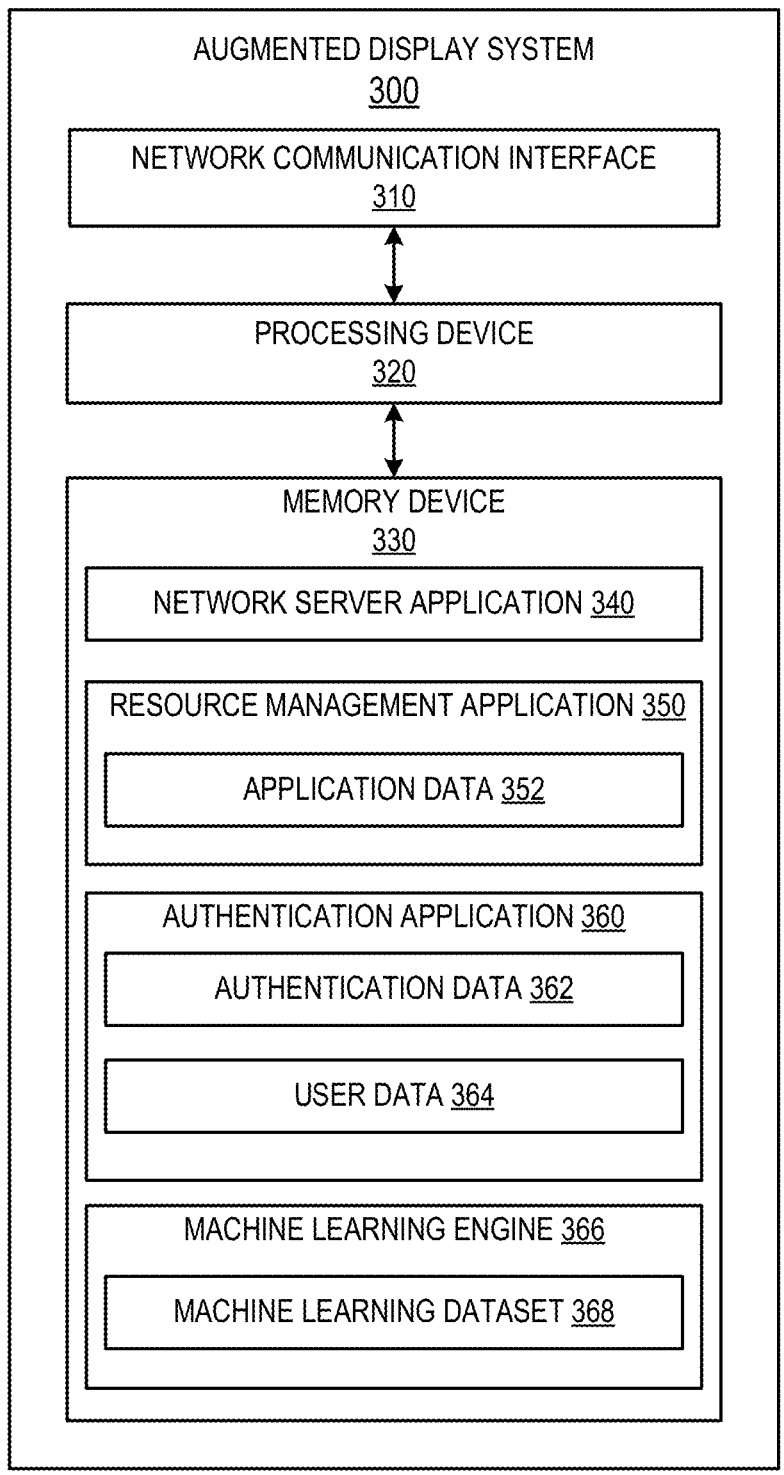
Figure 4:
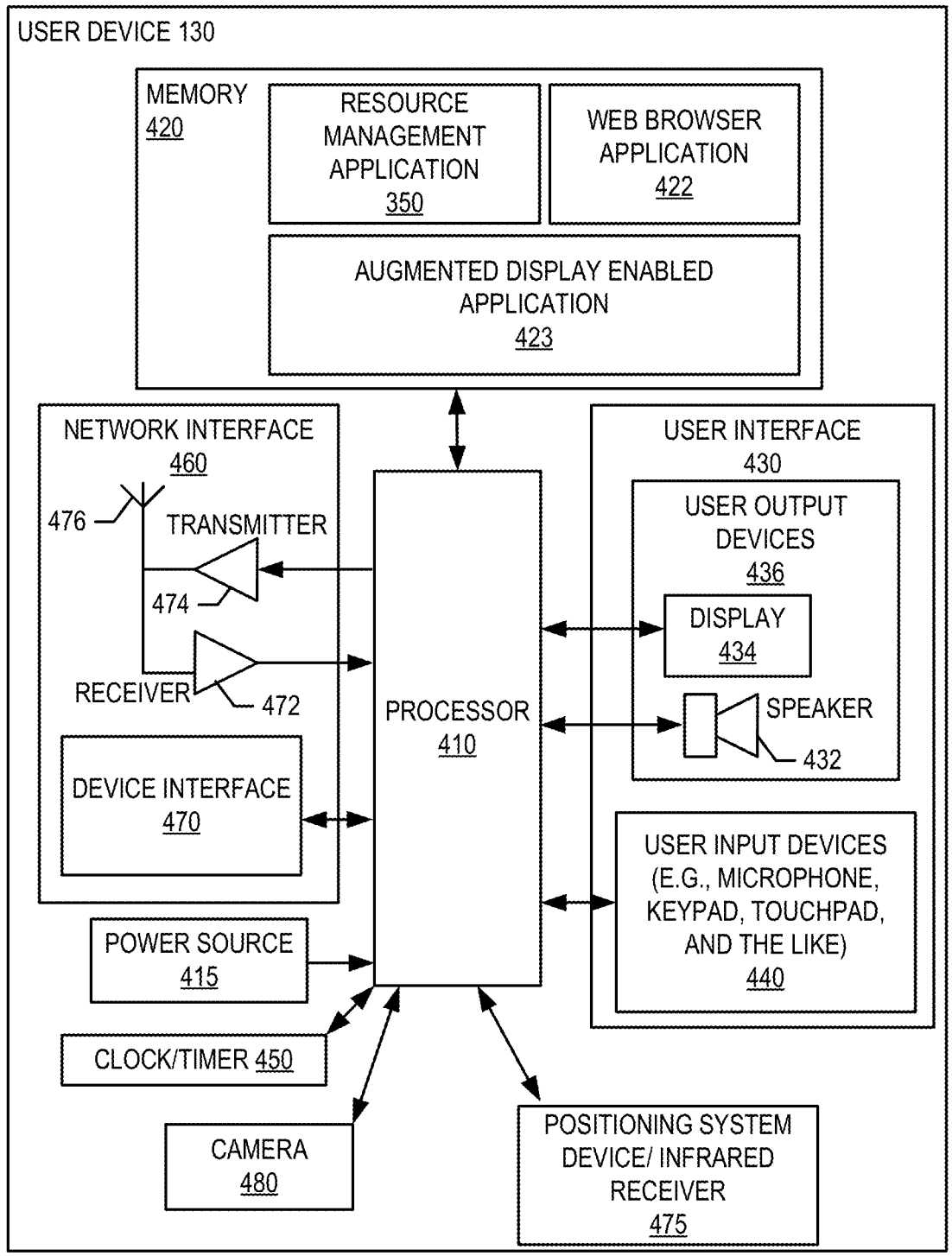
Figure 5:
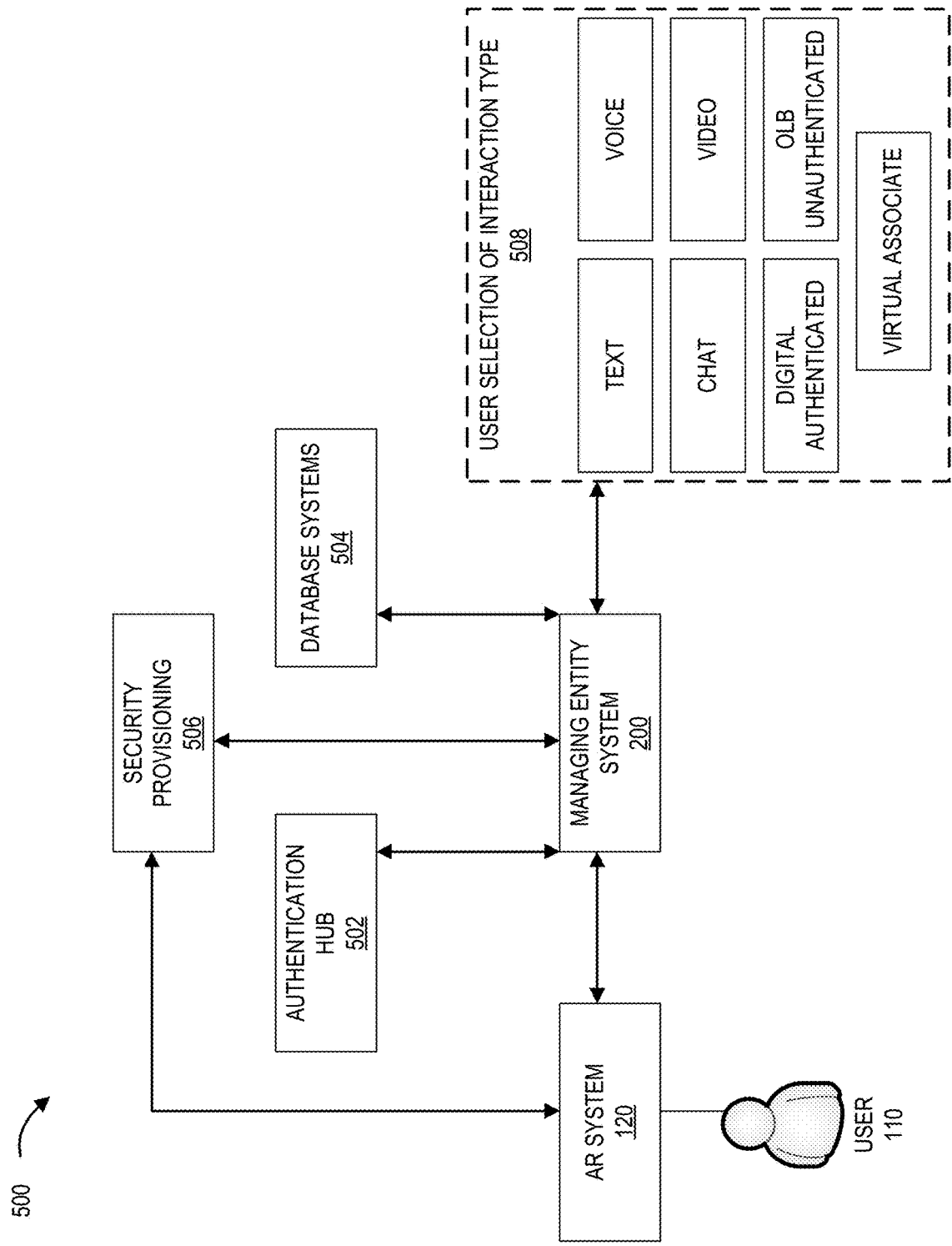

Having thus described embodiments of the invention in general terms, reference will now be made the accompanying drawings, wherein:

FIG. 1 provides a diagram illustrating a system environment, in accordance with an embodiment of the invention;

FIG. 2 provides a block diagram illustrating various components of a managing entity system, in accordance with an embodiment of the invention;

FIG. 3 provides a block diagram illustrating various components of an augmented display system, in accordance with an embodiment of the invention;

FIG. 4 provides a block diagram illustrating various components of a user device, in accordance with embodiments of the invention; and FIG. 5 depicts a process flow 500 for providing a multipoint validation with an associated augmented or virtual reality application interface, in accordance with embodiments of the invention.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Entity" or "managing entity" as used herein may refer to any organization, entity, or the like that may have one or more employees or administrators who utilize the described system, or in some cases who are responsible for managing or configuring the described system (e.g., configuring user-specific features, authorized access, or the like). In some embodiments, this may include commercial banks, thrifts, federal and state savings banks, savings and loan associations, credit unions, investment companies, insurance companies, software companies, or the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be a merchant, or other kind of commercial entity.

"Entity system" or "managing entity system" (such as managing entity system 200) as used herein may refer to the computing systems, devices, software, applications, communications hardware, and/or other resources used by the entity to perform the functions as described herein, or used to control or configure the described systems and its components. Accordingly, the entity system may comprise desktop computers, laptop computers, servers, Internet-of-Things ("IoT") devices, networked terminals, mobile smartphones, auxiliary devices, smart devices (e.g., smart watches), network connections, and/or other types of computing systems or devices and/or peripherals along with their associated applications.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an administrator, an engineer, a manager, an analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be representative of a system performing one or more tasks described herein. In still further embodiments, a user may be representative of one or more entities given access to the described systems as a service, such as a third party system user, or the like.

As used herein, a "user interface" may be any device or software that allows a user to input information, such as commands or data, into a device, or that allows the device to output information to the user. For example, the user interface may include a graphical user interface (GUI), or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, headset, and/or other user input/output device for communicating with one or more users. In some embodiments, the user interface may be a combination of devices which interface to provide an augmented display experience.

For instance, the user may wear an augmented reality (AR) or virtual reality (VR) headset, also referred to herein as the augmented reality (AR) system, which interfaces with one or more other displays or devices in order to provide an overlay of additional information. In some embodiments, the user interface may be tailored to a specific user's role, access permissions, preferences, or the like, as described herein. In some embodiments, the AR system may be one or more devices that operate to display a projection to one or more users. For instance, in some embodiments, as opposed to the user wearing a headset or other device, an augmented visual overlay of the user's surroundings may be presented using a holographic projection viewable to multiple users at once. In some embodiments, one or more AR systems, whether headset or projection-type systems, may operate in cooperation with a back-end augmented display system to receive device-specific or user-specific information. For instance, the augmented display system may transmit different perspective views to different areas, users, or the like, or may alter the perspective view of the visual overlay based on a known position of one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning, or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

"Distributed register" or "distributed electronic register" as used herein may refer to a structured list of data records that is decentralized and distributed amongst a plurality of computing systems and/or devices. In some embodiments, the distributed register may be a distributed ledger that includes a chain of entries or entries on a blockchain. As such, distributed register as used herein may also refer to a data structure which may comprise a series of sequentially linked "entries," or "entries," where each entry may comprise data and metadata. The "data" within each entry may comprise one or more "data record" or "transactions," while the "metadata" within each entry may comprise information about the entry, which may include a timestamp, a hash value of data records within the entry, and a pointer (e.g., a hash value) to the previous entry in the distributed register. In this way, beginning from an originating entry (e.g., a "genesis entry"), each entry in the distributed register is linked to another entry via the pointers within the entry headers. If the data or metadata within a particular entry in the distributed register becomes corrupted or modified, the hash values found in the header of the affected entry and/or the downstream entries may become mismatched, thus allowing the system to detect that the data has been corrupted or modified.

Generally, a distributed register is an "append only" register in which the data within each entry within the distributed register may not be modified after the entry is added to the distributed register; data may only be added in a new entry to the end of the distributed register. In this way, the distributed register may provide a practically immutable record of data over time.

"Permissioned distributed register" as used herein may refer to a distributed register for which an access control mechanism is implemented such that only known, authorized users may take certain actions with respect to the distributed register (e.g., add new data records, participate in the consensus mechanism, or the like). Accordingly, "unpermissioned distributed register" as used herein may refer to a distributed register without an access control mechanism.

"Private distributed register" as used herein may refer to a distributed register accessible only to users or devices that meet specific criteria (e.g., authorized users or devices of a certain entity or other organization). Accordingly, a "public distributed register" is a distributed register accessible by any member or device in the public realm.

"Node" as used herein may refer to a computing system on which the distributed register is hosted. Typically, each node maintains a full copy of the distributed register. In this way, even if one or more nodes become unavailable or offline, a full copy of the distributed register may still be accessed via the remaining nodes in the distributed register system.

"Consensus," "consensus algorithm," or "consensus mechanism" as used herein may refer to the process or processes by which nodes come to an agreement with respect to the contents of the distributed register. Changes to the distributed register (e.g., addition of data records) may require consensus to be reached by the nodes in order to become a part of the authentic version of the distributed register. In this way, the consensus mechanism may ensure that each node maintains a copy of the distributed register that is consistent with the copies of the distributed register hosted on the other nodes; if the copy of the distributed register hosted on one node becomes corrupted or compromised, the remaining nodes may use the consensus algorithm to determine the "true" version of the distributed register. The nodes may use various different mechanisms or algorithms to obtain consensus, such as proof-of-work ("PoW"), proof-of-stake ("PoS"), practical byzantine fault tolerance ("PBFT"), or the like.

As used herein, a "resource" may generally refer to objects, products, devices, goods, commodities, services, or the like, and/or the ability and opportunity to access and use the same. Some example implementations herein contemplate a market value of a property held by a user, including property that is stored and/or maintained by a third-party entity. For purposes of this invention, a resource is typically stored in a resource repository—a storage location where one or more resources are organized, stored, and retrieved electronically using a computing device.

Aspects of the invention described herein provide an innovative solution for augmenting user environments to provide an enhanced and consistent or dynamic environment no matter the user's particular location, and depending on the user's preferences or situational requirements. The invention provides a user experience that may be both more enjoyable and more productive than conventional office or remote-work environments, and may also allow for increased efficiency through the use of intelligent gesturing and predictive adaptability. As such, the system allows for dynamic response to user input, user preferences, user data patterns, user role within an entity, or situational demands.

For instance, through the use of augmented reality systems, it is conceivable that the user's environment may be transformed via the use of virtual information overlay. In some embodiments, this may comprise a digitization of the user's individual office space through the overlay of particular environmental features on the user's actual surroundings (e.g., a virtual plant on a desk, a virtual phone nearby that the user may interact with, a virtual picture frame with a family photo overlaid on the wall nearby, or the like). In some embodiments, this may allow for increased consistency. For instance, the invention may be used to emulate the user's typical workplace environment regardless of the user's actual location (e.g., the user may be made to feel as though they are at their workplace office even though they are in a relatively blank room at their home, or the like). Not only does this give the user a sense of familiarity regardless of their actual location, it allows multiple users to utilize the same space, thereby increasing the efficiency of physical space usage. For instance, a single blank room may be utilized by two roommates or living partners to emulate their particular office spaces. In other embodiments, the same shared workspace at an office building may be reserved by one or more individuals on different days, and each of those individual users could utilize a communal workspace in an individualized manner.

In other embodiments, the invention may be used to interface with one or more user devices in order to augment the user's experience with those devices and to further integrate the device into an augmented virtual environment. For instance, a user device such as a mobile phone may be integrated within the augmented environment to appear as a desk phone that the user can interact with (e.g., the mobile phone rings, but the user sees a visualization of a desk phone on their workstation ringing, and may gesture toward the visualization of the desk phone in order to answer or deny the call). In some embodiments, the user device integrated in this manner may not necessarily be a physical device, but rather a virtual machine, or virtual communication application, such as a voice over IP (VoIP) phone (e.g., the user receives a VoIP call and the system generates a visualization of a physical desk phone which the user may interact with).

FIG. 1 provides a diagram illustrating a system environment, in accordance with an embodiment of the invention. As illustrated in FIG. 1, the system environment 100 includes a managing entity system 200, an augmented display system 300, one or more user device(s) 130, an augmented reality (AR) System 120, and one or more third party systems 140. One or more users 110 may also be included in the system environment 100 for representative purposes. In some embodiments, the user(s) 110 of the system environment 100 may be customers of a managing entity that owns or otherwise controls the augmented display system 300 which may, in some embodiments, comprise a financial institution. In other embodiments, the user(s) 110 may be employees of a managing entity.

The managing entity system 200, the augmented display system 300, the one or more user device(s) 130, the AR system 120, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In some embodiments, the AR system 120 may be in connection with the network 150 only when the AR system 120 is at a certain interaction distance from one or more user device(s) 130. In this way, the AR system 120 may interact with the other systems and devices of the environment via one or more user device(s) 130. In other embodiments, the AR system 120 may be in separate connection with the augmented display system 300 or the managing entity system 200, wherein the augmented display system 300 or the managing entity system 200 is transmitting instructions to control the display interface of one or more user device(s) 130 and the AR system 120 in concert.

The managing entity system 200 may be a system owned or otherwise controlled by a managing entity to perform one or more process steps described herein. In some embodiments, the managing entity is a financial institution. In general, the managing entity system 200 is configured to communicate information or instructions with the augmented display system 300, the one or more user device(s) 130, and/or the third party system 140 across the network 150. For example, the managing entity system 200 may maintain account data for the user 110 and therefore may receive a transaction request or other event request associated with the user 110 (e.g., via a third party system 140 comprising a merchant system), compare received information to an internal database of a user associated with the user 110, and transmit authentication or other approval information to the augmented display system 300, the third party system 140, the user device 130, or the like. The augmented display system 300 may be a system owned or controlled by the managing entity and/or a third party that specializes resource management, resource exchange hosting, user authentication systems, data management, systems engineering, IT support, or the like. In some embodiments, at least a portion of the augmented display system 300 may be controlled by or otherwise be a component of the managing entity system 200.

For example, the augmented display system 300 may provide an augmented display for a user customer service experience with the managing entity system. In some embodiments, augmented display system 300 provides additional tailored, user-specific detail related to one or more user resource accounts, resource activities, service requests, or the like. For instance, the user may request a certain resource service from the managing entity system, such as ordering a cashier's check, or the like. In some embodiments, the AR system 120 may be utilized to communicate with the user 110 in order to complete verification of the user and interact with the user in order to gather additional details related to the request. In some embodiments, authenticating the user may involve use of one or more third party system(s) 140. In some embodiments, the third party system(s) 140 may include one or more distributed registers, blockchains, or decentralized public, private, or hybrid public/private ledgers which allow the user to authenticate their identity with the managing entity system 200. In this way, the managing entity system 200 may be able to complete customer service requests remotely in a secure manner in addition to providing the user with a lifelike experience via the AR system 120, thereby alleviating the need for the user to visit a physical location to conduct certain "last-mile" activities which are typically reserved for in-person interactions. "Last mile" items may include, but are not limited to, complex title transfer or verification requests (trusts, estates, or the like), youth accounts, document capture, small business products or services, notary services, medallion signature guarantees, deposit hold releases, commercial loan payments, safe deposit payments, withdrawals for large clients or clients' behalf, resource advances, cashier's checks, certificate of deposit redemptions, retirement account redemptions, commercial loan payments, savings bond redemptions, currency exchanges, foreign account transfers, coin orders, or the like. As such, the managing entity system 200 may provide fully digital and remote experiences for convenient customer service request completion in a secure manner, particularly for requests or activities which are not conventionally completed remotely, via integration of a secure authentication process in conjunction with a lifelike user experience. This not only provides enhanced security for the customer, but also presents the user with a seamless user experience with a relatively high degree of comfort and familiarity.

The user device 130 may be a system owned or controlled by the managing entity, the user 110, and/or a third party that specializes in providing computers, mobile devices, or the like. In general, the user device 130 is configured to communicate information or instructions with the managing entity system 200, the augmented display system 300, the AR System 120, and/or the third party system 140 across the network 150. For example, the user device 130 may detect an interaction with the AR system 120, extract resource management information (e.g., server location information, or information about other network resources, or the like), transmit the resource information to the managing entity system 200 and/or the augmented display system 300, and receive a confirmation or responses from the augmented display system 300. In other embodiments, the AR system 120 may interface with the augmented display system 300 in order to receive user configuration data unique to the particular user logged into the system and using it at the current time. In this way, the same AR system 120 may be used to load multiple user configurations remotely via the augmented display system 300 such that it can be used by multiple different users (e.g., multiple users may share an AR system 120 and alternate using the AR system 120 in a given time period, but may load their specific preferences and workstation attributes via user configurations stored on the augmented display system 300 or entity system 200).

The AR system 120 may comprise any device, system, set of devices, or the like that is configured to generate an experience taking place within simulated and immersive environments that can be similar to or completely different from the real world, or may augment how the user 110 perceives the real world, such as augmented reality devices, mixed reality devices, or the like. In preferred embodiments, the AR system 120 is a device which augments reality of the user's surroundings, allowing the user to stay in context of their actual surroundings, view one or more user device 130 screens, or the like, while receiving an overlay of additional (or "augmenting") information as a visual overlay on the user's actual surroundings. In some embodiments, it is conceivable that the AR System 120 may be embedded within, or otherwise be a component of, the user device 130 (e.g., a mobile phone, wearable device, personal computer, or the like). In some embodiments, the AR system 120 may use either headsets or specialized glasses designed to be placed on the head of a user 110, or multi-projected environments to generate realistic images, sounds and other sensations that simulate a virtual or semi-virtual (augmented) environment. For example, the user may wear a headset or pair of glasses with a specialized display resolution which allows the user to easily view the screen at a minimal distance of inches or less. In some embodiments, a virtual reality environment of the user's typical office space, workplace, or the like, may be emulated, allowing the user to virtually visit their place of work remotely. A user 110 using AR equipment is able to look around the artificial world, move around in it, and interact with virtual features or items. In preferred embodiments, the user is not removed from their physical surroundings and immersed in a totally virtual environment. Rather, the user is able to receive additional information via the AR system 120 in a seamless, personalized fashion wherein the information is overlaid on or otherwise augments the user's view or perspective of their existing environment. It is understood that any graphical depictions generated by the augmented display system 300 may be designed to be displayed and interacted with a number of devices, including user device(s) 130 and one or more AR system(s) 120 (e.g., multiple AR systems 120 may be integrated remotely to display common information to multiple users in a conference setting, or the like, and may be oriented with respect to one another in a consistent manner in the augmented environment).

The third party system 140 may be any system that interacts with the other systems and devices of the system environment 100 including, but not limited to, merchant systems, third party data centers, access providers, data storage systems, third party user authentication systems, transaction systems, resource exchanges, web servers, or the like. For instance, in some embodiments, the managing entity system may need to contact one or more third party system(s) 140 in order to access resource accounts and resource exchanges, gain or check regulatory approval for the movement of resources, verify transactions or occurrences on a blockchain, or share user data that may be pertinent to the experience of the user 110 as they interact with the augmented display system 300.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution.

It should be understood that the memory device 230 may include one or more databases or other data structures/ repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, an account application 260 which includes account data 262, and other computer-executable instructions or other data. The computer-executable program code of the network server application 240, the managing entity application 250, and/or the account application 260 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise user authorization-information for one or more users that are employees of or are otherwise associated with the managing entity. The managing entity data 252 may additionally include a list of users, user roles, user access permissions, or other data such as information for establishing secure communication channels with authentication devices, user devices 130, AR systems 120, other entity systems or the like. In some embodiments, the managing entity data 252 further comprises system architecture information, such as resource usage by various devices or virtual machines (e.g., network bandwidth, memory, processing load, or the like), status of machines connected over an entity managed network, status of one or more server(s), status of one or more virtual machine session(s), status of applications, application permissions, identified issues, unauthorized access or unauthorized attempt notifications, or the like. The managing entity data 252 may also include user configurations for storing preferences related to the user's preferred experience with one or more AR systems 120.

In one embodiment, the account application 260 includes the account data 262. This account data 262 may include financial account information for one or more users associated with the managing entity system 200, such as customers of the entity. For example, the account data 262 may comprise account numbers, routing numbers, account balances, account rules, account preferences, billing information, credit information, loan information, digital wallet information, authentication information, dynamic resource value information, expected dynamic resource value information, historical and current resource exchange information or the like. In this way, one or more employees of the managing entity system may view user account data, based on their level of access permission, such as during a customer service call, brokerage call, help session, or the like.

The network server application 240, the managing entity application 250, and the account application 260 are configured to invoke or use the managing entity data 252, the account data 254, or the like when communicating through the network communication interface 210 with the augmented display system 300, the one or more user device(s) 130, the AR System 120, and/or the third party system 140 in order to provide access to various information to be displayed on such devices.

FIG. 3 provides a block diagram illustrating the augmented display system 300, in greater detail, in accordance with embodiments of the invention. As illustrated in FIG. 3, in one embodiment of the invention, the augmented display system 300 includes one or more processing devices 320 operatively coupled to a network communication interface 310 and a memory device 330. In certain embodiments, the augmented display system 300 is operated by a first entity, such as a financial institution, while in other embodiments, the augmented display system 300 is operated by an entity other than a financial institution.

It should be understood that the memory device 330 may include one or more databases or other data structures/ repositories. The memory device 330 also includes computer-executable program code that instructs the processing device 320 to operate the network communication interface 310 to perform certain communication functions of the augmented display system 300 described herein. For example, in one embodiment of the augmented display system 300, the memory device 330 includes, but is not limited to, a network server application 340, a resource management application 350 which includes application data 352, an authentication application 360 which includes a authentication data 362 and user data 354, and other computer-executable instructions or other data. The computer-executable program code of the network server application 340, the resource management application 350, and/ or the authentication application 360 may instruct the processing device 320 to perform certain logic, data-processing, and data-storing functions of the augmented display system 300 described herein, as well as communication functions of the augmented display system 300.

In one embodiment, the resource management application 350 includes application data 352. The application data 352 may comprise information for storing data or information associated with one or more users, their preferences, or their current application session. The application data 352 may additionally or alternatively include information for comparing data received from third party systems 140, managing entity system 200, or the like, such as account information, web services information, application usage information, login session information, user preferences, user role within an entity, or the like, to a stored database (e.g., a relational database) of associated information. In another embodiment, the application data 352 may include resource information, for instance, when the augmented display system 300 receives information from the managing entity system 200, the resource management application 350 can parse the data and display it via one or more user device(s) 130, or partially display certain information via one or more AR system(s) 120, based on the user's preferences or permissions (e.g., the augmented display system 300 may route sensitive data to the AR system 120 in order to reduce the ability for unauthorized viewing, or the like).

In one embodiment, the authentication application 360 includes authentication data 362 and user data 364. The authentication data 362 may include passwords, personal identification numbers, security questions, unique biometric information, dynamic two-factor authentication information, system security status, authentication images (e.g., security footage, or the like), stepped-up authentication information (e.g., tiered security information allowing users to access some data, but wherein they must provide additional authentication or verification information to access other, more sensitive information), or other authentication credentials (including secondary or stepped-up authentication credentials) associated with one or more users. This authentication data 362 can be accessed by the authentication application 360 to compare received authentication credentials to the stored authentication credentials when determining whether a user is authorized for viewing certain information, or for determining which information is displayed via one or more AR system(s) 120 automatically as an augmented overlay. For example, all users may see a baseline augmentation of the managing entity system 200 portal or interface, but only certain users who provide stepped-up authorization credentials via the AR systems 120 or user device 130 may receive a fully augmented view of certain information, such as user account information, system resources, system architecture or status, or the like. The user data 364 may comprise any additional information that the authentication application 360 may store for use in authenticating a user (e.g., establishing a contactless NFC chip for a user to authenticate via their user device 130, or the like).

The network server application 340, the resource management application 350, and the authentication application 360 are configured to invoke or use the application data 352, the authentication data 362, and the user data 364, when communicating through the network communication interface 310 with the managing entity system 200, the one or more user device(s) 130, the AR system 120, and/or third party systems 140.

The augmented display system 300 may also contain a machine learning engine 366 and machine learning dataset(s) 368. The machine learning engine 366 may store instructions and/or data that may cause or enable the augmented display system 300 to receive, store, and/or analyze data received by the managing entity system 200, user's device 130, or AR system 120. The machine learning engine 366 and machine learning dataset 368 may store instructions and/or data that cause or enable the augmented display system 300 to determine patterns and correlations within received user data. In some embodiments, the machine learning dataset(s) 368 may contain data relating to user activity or device information, which may be stored in a user account managed by the managing entity system 200. In other embodiments, the machine learning engine 366 may be utilized to analyze user input received via the AR system 120 and generate responsive communication. For instance, the machine learning engine 366 may be utilized as the engine for a "smart assistant" which analyzes user voice input, text input, or other communication channel information in order to dynamically respond to user requests during an interactive session with the managing entity system 200. In some embodiments, the smart assistant may be presented via a dynamic avatar, or the, which may be configurable by the user in terms of voice, appearance, or the like. The dynamic avatar may also change based on the interaction initiated by the user. For instance, if the user is requesting help with a retirement account, the user may be presented with the same dynamic avatar each time in order to build familiarity. In other embodiments, the dynamic avatar may be generated by the machine learning engine 366 in response to customer service representative input, or a user from the side of the managing entity system 200. For instance, instead of the smart assistant generating machine responses, the dynamic avatar may receive input from an employee of the managing entity system 200, and may be used as an avatar to represent the employee's communication and mannerisms.

The machine learning engine 366 may receive data from a plurality of sources and, using one or more machine learning algorithms, may generate one or more output statistics stored in the machine learning dataset(s) 368. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention. Data generated by the machine learning engine 366 may be utilized by the augmented display system 300 in order to inform recommendations for one or more users. For instance, machine learning engine 366 may identify that a certain percentage of users experienced increased productivity (as determined by interaction time with one or more applications associated with productivity) when implementing a certain augmented reality aspect via AR system 120, and may recommend those certain aspects to other similar users.

FIG. 4 provides a block diagram illustrating a user device 130 in more detail, in accordance with embodiments of the invention. In one embodiment of the invention, the user device 130 is a mobile telephone, laptop, desktop, or the like. Other types of computing devices may include augmented reality systems, televisions, monitors, consoles, smart assistants, or other internet-of-things connected devices, such as standalone cameras, video recorders, audio/video players, GPS devices, wearable devices, electronic kiosk devices, or the like.

Furthermore, it should be known that multiple user device(s) 130 may be owned by or accessed by the user 110 within the system environment 100 of FIG. 1, and these separate user device(s) 130 may be in network communication with each other and the other systems and devices of the system environment 100, such as augmented display system 300, managing entity system 200, and AR system 120. For example, a first user device 130 may comprise a mobile phone of the user 110 that includes an interface for working in concert with a second user device 130 that comprises a personal computer of the user 110 or an AR system 120 of the user 110. For instance, in some embodiments, a first user device 130 may be used for biometric authentication of a specific user, a second user device 130 may act as a desktop or laptop workstation of the specific user, and a AR system 120 may be enabled to augment the details transmitted to be displayed via the first or the second user device 130. In some embodiments, the AR system 120 may be configured to display virtual representations of one or more devices. For example, a user device 130 such as a mobile phone may reside in a user's pocket, and may be displayed via the AR system 120 as a desk phone situated on the user's workstation. In such embodiments, the AR system 120 may interface with the user device 130 via wireless communication, such as a local area network, Bluetooth connection, or the like, in order to receive data from the user device 130 and display status information, incoming call information, messages, or the like, in a visual manner in the user's field of view. As such, any or all of the described components herein with regard to FIG. 4 may exist in the first user device 130, the second user device 130, and so on. In some embodiments, the AR system 120 is considered to be a specialized subset of user device 130, and as such, may contain the same or similar components as described with regard to user device 130, and is used to route information from one or more user devices 130 to the augmented display system 130.

Some embodiments of the user device 130 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the user device 130. For example, the processor 410 may include a digital signal processor device, a microprocessor device, and various analog to digital converters, digital to analog converters, and/or other support circuits. Control and signal processing functions of the user device 130 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 130 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the user device 130 may be configured to operate with one or more air interface standards, communication protocols, modulation types, and access types. By way of illustration, the user device 130 may be configured to operate in accordance with any of a number of first, second, third, and/or fourth-generation communication protocols and/or the like. For example, the user device 130 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols, fifth-generation (5G) wireless communication protocols, millimeter wave technology, and/or the like. The user device 130 may also be configured to operate in accordance with non-cellular communication mechanisms, such as via a wireless local area network (WLAN) or other communication/data networks, such as a Bluetooth network standard for the short-range wireless interconnection of electronic devices.

As described above, the user device 130 has a user interface that is, like other user interfaces described herein, made up of user output devices 436 and/or user input devices 440. The user output devices 436 include a display 430 (e.g., a liquid crystal display, organic light emitting diode display (OLED), or the like) and a speaker 432 or other audio device, which are operatively coupled to the processor 410. In some embodiments, the display 430 may be a visual projection overlay type display for projection of information on a user's field of vision via a glass or polymer surface worn over the user's eyes. The user input devices 440, which allow the user device 130 to receive data from a user such as the user 110, may include any of a number of devices allowing the user device 130 to receive data from the user 110, such as a keypad, keyboard, touch-screen, touchpad, microphone, mouse, joystick, other pointer device, button, soft key, and/or other input device(s). The user interface may also include a camera 480, such as a digital camera or other optical sensor for receiving data on the user's surroundings. In some embodiments the camera 480 may be used to aid in determining the position of the user's view with respect to the display 434. For instance, the camera may be located at a fixed position with respect to the display 434, and may use image data in conjunction with data received from the positioning system deice/infrared receiver 475 in order to determine location or orientation of the user's gaze, or the location or orientation of one or more AR systems 120. In some embodiments, the AR systems 120 may contain specialized light emitting or infrared light emitting sources that interface with the user device 130.

The user device 130 may also include a positioning system device/infrared receiver 475 that is configured to be used by a positioning system to determine a location of the user device 130. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the user device 130. In other embodiments, the positioning system device 475 includes a proximity sensor or transmitter, such as an RFID tag, infrared receiver, or the like, that can sense or be sensed by devices known to be located proximate to the user device 130, such as one or more AR systems 120. The infrared receiver may be used to track one or more infrared light emitting sources on the AR systems 120 in order to determine the exact orientation and change in orientation of a user's view with respect to the display 434.

In other embodiments, the augmented display system 300 may process information received from the AR system 120 in order to determine the orientation of the user's gaze. For instance, the AR system 120 may contain a gyroscope, infrared light sensor, Light Detection and Ranging (LiDAR) sensor, or the like, which may provide data to the augmented display system 300 for further processing. LiDAR systems of the AR system 120 may employ the use of Time of Flight (ToF) principles, wherein light is emitted at time t–0, hits an object, is reflected back, and is then measured by an array of sensors at time t–1. Based on knowledge about the speed of light, the measured interval—the ToF— can easily be converted into a precise distance. In some instances, considering how much light is returned, the size and shape of the object can also be determined, and may be used by the augmented display system 300 in order to generate virtual visualizations in the correct aspect ratio, size, perspective, or the like. Such calculations and analysis of the user's surroundings may be occurring continuously over a period of time as the user is engaging with the AR system 120. In some embodiments, analysis of the user's surroundings via processing of received LiDAR and video information may be performed locally on the AR system 120 via a positioning system 475 in conjunction with processor 410, or one or more specialized processors with dedicated onboard resources for processing positioning data.

The user device 130 further includes a power source 415, such as a battery, for powering various circuits and other devices that are used to operate the user device 130. Embodiments of the user device 130 may also include a clock or other timer 450 configured to determine and, in some cases, communicate actual or relative time to the processor 410 or one or more other devices.

The user device 130 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the user device 130 and/or one or more of the process/method steps described herein. For example, the memory 420 may include such applications as a conventional web browser application 422, or the resource management application 350, or an augmented display enabled application 423. These applications also typically instructions to a graphical user interface (GUI) on the display 430 that allows the user 110 to interact with the user device 130, the managing entity system 200, the augmented display system 300, one or more AR systems 120, or other devices or systems. In some embodiments, the augmented display enabled application may be used by the augmented display system 300 in order to track the user's input via one or more connected peripherals, or the like, and the augmented display system may transmit information to the user device 130 for display via the augmented display enabled application 423, while simultaneously transmitting information designed to overlay the augmented display enabled application 423 to one or more AR systems 120.

The resource management application 421 may comprise an application stored in the memory 420 that is configured to control and/or communicate with the mobile device system 400 to receive data or information (e.g., codes, signals, or the like) from the user device 130. The resource management application 421 may also be configured to communicate information received from the web browser application 422, and/or the augmented display enabled application 423. In some embodiments, the resource management application 421 may be configured to receive instructions from a separate system (e.g., the managing entity system 200, the augmented display system 300, a separate user device 130, and/or a third party system 140, such as a merchant system), and cause one or more components of the user device 130 to perform one or more actions. For example, the resource management application 421 may be configured to receive instructions for generating an alert on the user device 130 via audio or visual signals.

The resource management application 421 may also cause the user device 130 to store or erase certain information located in the memory 420 based on executed resource management actions.

The memory 420 can also store any of a number of pieces of information, and data, used by the user device 130 and the applications and devices that make up the user device 130 or are in communication with the user device 130 to implement the functions of the user device 130 and/or the other systems described herein. For example, the memory 420 may include such data as transaction history data, positional data of the user device 130, biometric authentication information for the user 110, device identifiers for one or more other user devices 130, wireless network authentication information, or the like.

FIG. 5 depicts a process flow 500 for providing a multi-point validation with an associated augmented or virtual reality application interface, in accordance with embodiments of the invention. As shown in FIG. 5, the user 110 may interact with the managing entity system 200 via the AR system 120 in order to perform a number of interactions. Some examples of user interactions are listed under user selection of interaction type 508, and may include text-based interactions, voice call interactions, customer service chat interactions, video call interactions, digitally authenticated interactions, online banking (OLB) interactions, virtual associate interactions, or the like.

As indicated in FIG. 5, the user's interaction with the managing entity system 200 is facilitated by authentication hub 502, database systems 504, and security provisioning 506. In some embodiments, the AR system 120 or other user device of the user may communicate with security provisioning 506 in order to authenticate or verify the user's identity during the interaction with managing entity system 200. In some embodiments, the security provisioning 506 may include a blockchain or distributed register system with which the user 110 maintains an account, wallet, or the like. In some embodiments, the security provisioning 506 may be at third party decentralized blockchain system which is used to authenticate the user 110. In some embodiments, the managing entity system 200 may invoke an authentication hub 502, which may include a multifactor authentication mechanism, or a multi-point authentication mechanism. It is understood that multi-point authentication may refer to the system's ability to collect multiple data points when attempting to authenticate the identity of user 110 during an interactive session. For instance, the managing entity system 200 may collect device data such as device ID (mac address, hardware serial number, or the like), browser information, operating system information, local network information, geolocation information, or the like, and may store such information in the database systems 504.

When the user 110 initiates an interactive session with the managing entity system 200, the system may cross reference available data received during the communication with information received in the past, potentially when the user 110 was setting up an online banking configuration, or the like, unrelated to the interactive session using the AR system 120. In this way, the ability for the managing entity system 200 to authenticate the user may be bolstered by historical interactions with the same user and information collected about the user's devices, usage patterns, or the like, when the user is interacting with a conventional mobile application, or when the user is visiting a brick and mortar location of the managing entity system 200. For instance, whenever the user 110 visits a branch location owned by the same entity as the managing entity system 200, the user 110 may possess a device which connects to a local network at that location, at which point the managing entity may be able to collect certain information about the device for later cross reference and use in authenticating the user during a later remote session.

In other embodiments, the database systems 504 may contain various biometric information related to the user 110 which they have opted to share with the managing entity system 200. For instance, certain biometric information may be stored on a user device 130, or on AR system 120, locally, and may be authenticated using an on-device chipset of the device. In other embodiments, certain biometric information such as mannerisms, voice patterns, or the like, may be collected with the user 110's permission, and stored in the database systems 504 for later reference. As discussed, such information collected by the managing entity system 200 may be later utilized to conduct a machine learning or neural network analysis in order to discern various patterns unique to the user across a large dataset or sampling of information related to the user 110. Using these various points of data collection, the managing entity system 200 may generate a confidence score regarding the user's identity. For instance, the user may authenticate themselves via the security provisioning 506 system, which may include a third party decentralized blockchain architecture, may authenticate themselves using the authentication hub 502, or may be authenticated using known data related to the user's device or unique to the user themselves, as stored in the database system 504. Given the nature of available data in any interaction with the user 110 via AR system 120, the system 200 may weight the authentication score differently. For instance, three or more positive authentication criteria may be required to positively verify the user's identity in once instance, while in another instance, one single strong positive identification criteria being verified may be enough for the system 200 to authenticate the user's identity. In some embodiments, if the user is able to authenticate themselves via a third party decentralized blockchain and various device ID information matches known device information collected for the user, the system may determine that the user can be authenticated. In other embodiments, the user may provide biometric authentication data which correlates with a relatively higher degree of confidence that the user's identity is verified, in which case the biometric authentication alone may suffice. In some embodiments, how these various multi-point verification datapoints are weighted may be determined and re-adjusted over time by one or more machine learning models of the system 200 as interactive sessions are analyzed in hindsight and determined to be successful.

In other embodiments, the machine learning engine 366 may be utilized to analyze user input received via the AR system 120 and generate responsive communication. For instance, the machine learning engine 366 may be utilized as the engine for a "smart assistant" which analyzes user voice input, text input, or other communication channel information in order to dynamically respond to user requests during an interactive session with the managing entity system 200. In some embodiments, the smart assistant may be presented via a dynamic avatar, or the, which may be configurable by the user in terms of voice, appearance, or the like. The dynamic avatar may also change based on the interaction initiated by the user. For instance, if the user is requesting help with a retirement account, the user may be presented with the same dynamic avatar each time in order to build familiarity. In other embodiments, the dynamic avatar may be generated by the machine learning engine 366 in response to customer service representative input, or a user from the side of the managing entity system 200. For instance, instead of the smart assistant generating machine responses, the dynamic avatar may receive input from an employee of the managing entity system 200, and may be used as an avatar to represent the employee's communication and mannerisms.

In light of the multi-point validation of user identity, the system 200 is able to host interactive sessions with the user via the AR system 120 to conduct a number of actions related to customer service, or the user's resource account, in a secure manner. In particular, it is understood that the present system enables remote interactive sessions to complete certain resource-related activities that conventionally are not completed in a remote manner. For instance, in conventional systems, certain interactions may be considered "last-mile" items, and typically require an in-person interaction in order to complete. However, utilizing the multi-point validation methods discussed above, the managing entity system 200 may be able to complete customer service requests remotely in a secure manner in addition to providing the user with a lifelike experience via the AR system 120, thereby alleviating the need for the user to visit a physical location to conduct certain last-mile activities which are typically reserved for in-person interactions. Last-mile items may include, but are not limited to, complex title transfer or verification requests (trusts, estates, or the like), resource actions related to youth accounts, document capture, small business products or services, notary services, medallion signature guarantees, deposit hold releases, commercial loan payments, safe deposit payments, withdrawals for large clients or clients' behalf, resource advances, cashier's checks, certificate of deposit redemptions, retirement account redemptions, commercial loan payments, savings bond redemptions, currency exchanges, foreign account transfers, coin orders, or the like. As such, the managing entity system 200 may provide fully digital and remote experiences for convenient customer service request completion in a secure manner, particularly for requests or activities which are not conventionally completed remotely, via integration of a secure authentication process in conjunction with a lifelike user experience. This not only provides enhanced security for the customer, but also presents the user with a seamless experience with a relatively high degree of comfort and familiarity, encouraging users to utilize the system for a full range of their resource account needs. As such, the user is able to interact with either a "smart assistant" or a real life employee of the managing entity system, via a representative avatar shown via the AR system 120, which is dynamically altered in response to the user's input, and which is transmitted and updated in real time via the connection between the managing entity system 200 and the AR device 120.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted, or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for augmented reality emulation facilitating user interactions, the system comprising:
   a memory device; and
   a processing device operatively coupled to the memory device, wherein the processing device is configured to execute computer-readable program code to:
   receive an interaction request from a user via an augmented reality device, wherein the interaction request comprises a request to communicate with an entity regarding a resource account;
   verify the user's identity via third party decentralized register;
   generate an augmented reality session in response to the interaction request via a machine learning engine, wherein generating an augmented reality session comprises initiating a customer service session with the user via depiction of a dynamic avatar, and wherein the dynamic avatar is altered based on the interaction initiated by the user;

transmit a real-time video stream of the dynamic avatar to the augmented reality device; and continually update the real-time video stream in response to one or more user inputs received via the augmented reality device.

2. The system of claim 1, wherein the real-time video stream further comprises a computer generated avatar.

3. The system of claim 1, wherein the augmented reality device further comprises a virtual reality headset.

4. The system of claim 1, wherein the interaction request further comprises one or more requests for sensitive resource account actions such as title transfer, notarization, resource advances, cashier's checks, retirement account redemptions, currency exchanges, or foreign account transfers.

5. The system of claim 1, wherein verifying the user's identity via third party decentralized security provisioning service further comprises conducting a verification transaction on a public blockchain to verify ownership of a wallet belonging to the user.

6. The system of claim 1, further configured to reference a multifactor digital authentication database in conjunction with verifying user's identity via third party decentralized register.

7. A computer program product for augmented reality emulation facilitating user interactions, the computer program product comprising at least one non-transitory computer readable medium comprising computer readable instructions, the instructions comprising instructions for:

receiving an interaction request from a user via an augmented reality device, wherein the interaction request comprises a request to communicate with an entity regarding a resource account;

verifying the user's identity via third party decentralized register;

generating an augmented reality session in response to the interaction request via a machine learning engine, wherein generating an augmented reality session comprises initiating a customer service session with the user via depiction of a dynamic avatar, and wherein the dynamic avatar is altered based on the interaction initiated by the user;

transmitting a real-time video stream of the dynamic avatar to the augmented reality device; and continually updating the real-time video stream in response to one or more user inputs via the augmented reality device.

8. The computer program product of claim 7, wherein the real-time video stream further comprises a computer generated avatar.

9. The computer program product of claim 7, wherein the augmented reality device further comprises a virtual reality headset.

10. The computer program product of claim 7, wherein the interaction request further comprises one or more requests for sensitive resource account actions such as title transfer, notarization, resource advances, cashier's checks, retirement account redemptions, currency exchanges, or foreign account transfers.

11. The computer program product of claim 7, wherein verifying the user's identity via third party decentralized security provisioning service further comprises conducting a verification transaction on a public blockchain to verify ownership of a wallet belonging to the user.

12. The computer program product of claim 7, further configured to reference a multifactor digital authentication database in conjunction with verifying user's identity via third party decentralized register.

13. A computer implemented method for augmented reality emulation facilitating user interactions, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving an interaction request from a user via an augmented reality device, wherein the interaction request comprises a request to communicate with an entity regarding a resource account;

verifying the user's identity via third party decentralized register;

generating an augmented reality session in response to the interaction request via a machine learning engine, wherein generating an augmented reality session comprises initiating a customer service session with the user via depiction of a dynamic avatar, and wherein the dynamic avatar is altered based on the interaction initiated by the user;

transmitting a real-time video stream of the dynamic avatar to the augmented reality device; and continually updating the real-time video stream in response to one or more user inputs via the augmented reality device.

14. The computer implemented method of claim 13, wherein the real-time video stream further comprises a computer generated avatar.

15. The computer implemented method of claim 13, wherein the augmented reality device further comprises a virtual reality headset.

16. The computer implemented method of claim 13, wherein the interaction request further comprises one or more requests for sensitive resource account actions such as title transfer, notarization, resource advances, cashier's checks, retirement account redemptions, currency exchanges, or foreign account transfers.

17. The computer implemented method of claim 13, further configured to reference a multifactor digital authentication database in conjunction with verifying user's identity via third party decentralized register.

* * * * *